(12) United States Patent
Bechtler et al.

(10) Patent No.: US 8,754,764 B2
(45) Date of Patent: Jun. 17, 2014

(54) GOOD CHECKING FOR VEHICLE PRESSURE SENSOR

(75) Inventors: Henrik Bechtler, Stuttgart (DE); Ravi Bhadange, Farmington, MI (US); Nachiket Patil, Farmington Hills, MI (US); Takeshi Tokonaga, Yokohama (JP); Stefan Mallmann, Lauffen (DE); Michael Schwab, Korntal (DE); Dietmar Stapel, Sendenhorst (DE); Willy Klier, Bloomfield Hills, MI (US); Joerg Eesmann, Rheine (DE)

(73) Assignee: Robert Bosch GmbH, Stuttgart (DE)

( * ) Notice: Subject to any disclaimer, the term of this patent is extended or adjusted under 35 U.S.C. 154(b) by 673 days.

(21) Appl. No.: 12/860,396

(22) Filed: Aug. 20, 2010

(65) Prior Publication Data

US 2011/0068913 A1 Mar. 24, 2011

Related U.S. Application Data

(60) Provisional application No. 61/236,407, filed on Aug. 24, 2009.

(51) Int. Cl.
*G08B 29/00* (2006.01)
*B60T 7/20* (2006.01)

(52) U.S. Cl.
USPC ...................... 340/506; 303/122.03

(58) Field of Classification Search
USPC ................ 340/506, 507, 626; 701/29.1, 29.7
See application file for complete search history.

(56) References Cited

U.S. PATENT DOCUMENTS

| | | | |
|---|---|---|---|
| 3,798,596 A | 3/1974 | Sumiyoshi et al. | |
| 3,803,425 A | 4/1974 | Carp | |
| 3,916,375 A | 10/1975 | Sumiyoshi et al. | |
| 4,219,244 A | 8/1980 | Griner et al. | |
| 4,233,599 A | 11/1980 | Brearley | |
| 4,234,866 A | 11/1980 | Kuroda et al. | |
| 4,379,520 A * | 4/1983 | Tomsu | 236/49.3 |
| 4,395,677 A * | 7/1983 | Petersdorf | 324/117 H |
| 4,484,119 A * | 11/1984 | Kerr | 318/563 |
| 4,497,201 A * | 2/1985 | Allen et al. | 73/114.41 |
| 4,609,905 A * | 9/1986 | Uzzo | 340/447 |

(Continued)

FOREIGN PATENT DOCUMENTS

| | | |
|---|---|---|
| DE | 19936596 | 1/2001 |
| EP | 1227019 | 7/2002 |
| IT | 1116563 | 2/1986 |

OTHER PUBLICATIONS

Office Action from the United States Patent and Trademark Office for U.S. Appl. No. 12/860,362 dated Jul. 19, 2012 (23 pages).

(Continued)

*Primary Examiner* — Hai Phan
*Assistant Examiner* — Royit Yu
(74) *Attorney, Agent, or Firm* — Michael Best & Friedrich LLP

(57) ABSTRACT

A mechanism for determining whether a malfunctioning pressure sensor has returned to a normal or acceptable operating range. The mechanism includes controllers and methods that perform a "good check" on the sensor to determine whether the sensor has returned to normal or acceptable operation after a malfunction has been detected. When a previously-malfunctioning sensor passes the "good check," warning lights (or tell-tale) indicators are shut off and systems that relied upon information from the malfunctioning sensor return to normal operation.

20 Claims, 10 Drawing Sheets

(56) References Cited

U.S. PATENT DOCUMENTS

| | | | |
|---|---|---|---|
| 4,648,662 A | 3/1987 | Fennel et al. | |
| 4,785,295 A * | 11/1988 | Fukui et al. | 340/679 |
| 4,839,811 A | 6/1989 | Kanegae et al. | |
| 4,886,291 A | 12/1989 | Okamoto | |
| 4,892,101 A * | 1/1990 | Cheung et al. | 600/323 |
| 4,934,474 A | 6/1990 | Sugasawa | |
| 4,953,652 A | 9/1990 | Ohmura et al. | |
| 4,961,144 A * | 10/1990 | Yabe et al. | 701/43 |
| 4,975,897 A * | 12/1990 | Tanahashi | 369/59.18 |
| 4,996,657 A | 2/1991 | Shiraishi et al. | |
| 5,008,823 A | 4/1991 | Takahashi | |
| 5,014,801 A | 5/1991 | Hirose | |
| 5,181,011 A * | 1/1993 | Okano | 340/438 |
| 5,186,153 A * | 2/1993 | Steinbrenner et al. | 123/519 |
| 5,190,522 A * | 3/1993 | Wojcicki et al. | 604/65 |
| 5,200,911 A | 4/1993 | Ishikawa et al. | |
| 5,201,380 A | 4/1993 | Callahan | |
| 5,271,475 A | 12/1993 | Takeshita | |
| 5,282,135 A | 1/1994 | Sato et al. | |
| 5,283,740 A | 2/1994 | Sato et al. | |
| 5,305,723 A | 4/1994 | Kadota | |
| 5,357,141 A | 10/1994 | Nitschke et al. | |
| 5,448,480 A | 9/1995 | Rauner et al. | |
| 5,457,632 A | 10/1995 | Tagawa et al. | |
| 5,473,147 A * | 12/1995 | Hoshino et al. | 235/449 |
| 5,481,906 A | 1/1996 | Nagayoshi et al. | |
| 5,532,476 A * | 7/1996 | Mikan | 250/221 |
| 5,544,073 A * | 8/1996 | Piety et al. | 700/279 |
| 5,564,429 A * | 10/1996 | Bornn et al. | 600/508 |
| 5,572,670 A | 11/1996 | Puckett | |
| 5,594,228 A * | 1/1997 | Swartz et al. | 235/383 |
| 5,636,121 A | 6/1997 | Tsuyama et al. | |
| 5,642,180 A * | 6/1997 | Yoshida | 396/207 |
| 5,671,981 A | 9/1997 | Sasaki et al. | |
| 5,696,690 A * | 12/1997 | Richardson et al. | 700/219 |
| 5,707,117 A | 1/1998 | Hu et al. | |
| 5,710,704 A | 1/1998 | Graber | |
| 5,712,784 A * | 1/1998 | Fendt et al. | 701/45 |
| 5,748,483 A * | 5/1998 | Richardson et al. | 700/223 |
| 5,752,208 A * | 5/1998 | Lerner | 701/41 |
| 5,899,948 A | 5/1999 | Raphael et al. | |
| 5,928,110 A | 7/1999 | Vornehm et al. | |
| 5,959,529 A * | 9/1999 | Kail, IV | 340/539.12 |
| 6,035,693 A | 3/2000 | Horiuchi | |
| 6,134,491 A | 10/2000 | Kawagoe et al. | |
| 6,144,904 A | 11/2000 | Tseng | |
| 6,198,988 B1 | 3/2001 | Tseng | |
| 6,212,465 B1 | 4/2001 | Sielagoski et al. | |
| 6,225,901 B1 * | 5/2001 | Kail, IV | 340/539.11 |
| 6,292,733 B1 | 9/2001 | Sugiyama et al. | |
| 6,301,536 B1 | 10/2001 | Vaessen et al. | |
| 6,305,760 B1 | 10/2001 | Otake | |
| 6,354,607 B1 | 3/2002 | Kawashima et al. | |
| 6,408,229 B1 | 6/2002 | Loudon et al. | |
| 6,427,102 B1 | 7/2002 | Ding | |
| 6,491,357 B2 | 12/2002 | Holst | |
| 6,502,025 B1 | 12/2002 | Kempen | |
| 6,519,515 B1 | 2/2003 | Baumann et al. | |
| 6,577,948 B1 | 6/2003 | Skellenger et al. | |
| 6,682,153 B2 | 1/2004 | Okai | |
| 6,834,221 B2 | 12/2004 | Jäger et al. | |
| 7,057,503 B2 | 6/2006 | Watson | |
| 7,058,490 B2 | 6/2006 | Kim | |
| 7,085,642 B2 | 8/2006 | Samuel et al. | |
| 7,191,041 B2 | 3/2007 | von Schwertfuehrer et al. | |
| 7,197,917 B2 * | 4/2007 | Hasegawa | 73/114.37 |
| 7,200,524 B2 | 4/2007 | Kang et al. | |
| 7,286,083 B2 | 10/2007 | Xie | |
| 7,823,986 B2 | 11/2010 | Ruffer et al. | |
| 8,155,823 B2 | 4/2012 | Itoh | |
| 8,159,945 B2 | 4/2012 | Muro et al. | |
| 8,260,516 B2 | 9/2012 | Bechtler et al. | |
| 2001/0044688 A1 | 11/2001 | Okita et al. | |
| 2001/0051845 A1 | 12/2001 | Itoh | |
| 2002/0075137 A1 | 6/2002 | Hofbeck et al. | |
| 2002/0101115 A1 | 8/2002 | Holst | |
| 2002/0113587 A1 | 8/2002 | Kim | |
| 2002/0189889 A1 | 12/2002 | Demerly | |
| 2003/0109939 A1 | 6/2003 | Burgdorf et al. | |
| 2003/0149540 A1 | 8/2003 | Kachel et al. | |
| 2004/0026148 A1 | 2/2004 | Matsuno | |
| 2004/0030474 A1 | 2/2004 | Samuel et al. | |
| 2004/0061500 A1 | 4/2004 | Lou et al. | |
| 2004/0243287 A1 | 12/2004 | Yanaka et al. | |
| 2005/0131602 A1 | 6/2005 | Souda | |
| 2005/0182555 A1 * | 8/2005 | Yu et al. | 701/107 |
| 2005/0228546 A1 | 10/2005 | Naik et al. | |
| 2006/0173584 A1 | 8/2006 | Einig et al. | |
| 2006/0181066 A1 | 8/2006 | Andres et al. | |
| 2007/0129871 A1 | 6/2007 | Post, II et al. | |
| 2007/0250183 A1 | 10/2007 | Howell et al. | |
| 2007/0279207 A1 | 12/2007 | Clark et al. | |
| 2007/0282558 A1 | 12/2007 | Sagisaka | |
| 2008/0059020 A1 * | 3/2008 | Sato | 701/35 |
| 2008/0097671 A1 | 4/2008 | Kojo et al. | |
| 2008/0176122 A1 | 7/2008 | Wake et al. | |
| 2008/0183350 A1 | 7/2008 | Noguchi | |
| 2008/0195275 A1 | 8/2008 | Kojo et al. | |
| 2008/0209992 A1 * | 9/2008 | Murayama | 73/114.43 |
| 2009/0055033 A1 | 2/2009 | Gansler et al. | |
| 2009/0069978 A1 | 3/2009 | Inage | |
| 2009/0164059 A1 | 6/2009 | Takeda | |
| 2010/0014302 A1 | 1/2010 | Okumura et al. | |
| 2010/0138105 A1 | 6/2010 | Shibasaki et al. | |
| 2010/0269500 A1 | 10/2010 | Ruffer et al. | |
| 2010/0274436 A1 | 10/2010 | Kodaka et al. | |
| 2011/0066319 A1 | 3/2011 | Bechtler et al. | |
| 2011/0066320 A1 | 3/2011 | Bechtler et al. | |
| 2011/0066321 A1 | 3/2011 | Bechtler et al. | |
| 2011/0068913 A1 | 3/2011 | Bechtler et al. | |
| 2011/0071723 A1 | 3/2011 | Bechtler et al. | |
| 2011/0071726 A1 | 3/2011 | Bechtler et al. | |
| 2011/0071727 A1 | 3/2011 | Bechtler et al. | |

OTHER PUBLICATIONS

Harland, David M., Lorenz, Ralph D., "Space Systems Failures", Springer Praxis Books, 2005, Part Two, 211-226, available at http://www.springerlink.com/content!n886138036412186/.
Office Action from the United States Patent and Trademark Office for U.S. Appl. No. 12/860,370 dated Jul. 5, 2012 (21 pages).
Office Action from the United States Patent and Trademark Office for U.S. Appl. No. 12/860,376 dated Aug. 3, 2012 (24 pages).
Notice of Allowance from the United States Patent and Trademark Office for U.S. Appl. No. 12/860,389 dated May 15, 2012 (8 pages).
Office Action from the United States Patent and Trademark Office for U.S. Appl. No. 12/860,407 dated Sep. 14, 2012 (18 pages).
Office Action from the United States Patent and Trademark Office for U.S. Appl. No. 12/860,418 dated Jul. 5, 2012 (23 pages).
EP10173774 European Search Report dated Nov. 30, 2010, 5 pages.
EP10173775 European Search Report dated Feb. 18, 2013, 2 pages.
Notice of Allowance from the United States Patent and Trademark Office for U.S. Appl. No. 12/860,376 dated Dec. 17, 2012 (11 pages).
Notice of Allowance from the United States Patent and Trademark Office for U.S. Appl. No. 12/860,362 dated Feb. 21, 2013 (11 pages).
Final Rejection from the United States Patent and Trademark Office for U.S. Appl. No. 12/860,370 dated Dec. 31, 2012 (22 pages).
Final Rejection from the United States Patent and Trademark Office for U.S. Appl. No. 12/860,407 dated Feb. 21, 2013 (28 pages).
Final Rejection from the United States Patent and Trademark Office for U.S. Appl. No. 12/860,418 dated Dec. 6, 2012 (7 pages).
Notice of Allowance from the United States Patent and Trademark Office for U.S. Appl. No. 12/860,418 dated Feb. 22, 2013 (14 pages).
Notice of Allowance from the United States Patent and Trademark Office for U.S. Appl. No. 12/860,370 dated Dec. 6, 2013 (12 pages).
Final Rejection from the United States Patent and Trademark Office for U.S. Appl. No. 12/860,407 dated Feb. 21, 2014 (9 pages).

* cited by examiner

GOOD CHECKING FOR VEHICLE PRESSURE SENSOR

RELATED APPLICATION

The present application claims the benefit of prior filed U.S. Provisional Patent Application No. 61/236,407 filed on Aug. 24, 2009, the entire content of which is hereby incorporated by reference.

This application is related to the following U.S. Patent Applications: U.S. patent application Ser. No. 12/860,362, filed on Aug. 20, 2010 entitled GOOD CHECKING FOR VEHICLE WHEEL SPEED SENSORS; and U.S. patent application Ser. No. 12/860,370, filed on Aug. 20, 2010 and entitled GOOD CHECKING FOR VEHICLE LONGITUDINAL ACCELERATION SENSOR; and U.S. patent application Ser. No. 12/860,376, filed on Aug. 20, 2010 and entitled GOOD CHECKING FOR VEHICLE LATERAL ACCELERATION SENSOR; and U.S. patent application Ser. No. 12/860,389, filed on Aug. 20, 2010 and entitled GOOD CHECKING FOR VEHICLE BRAKE LIGHT SWITCH; and U.S. patent application Ser. No. 12/860,407, filed on Aug. 20, 2010 and entitled GOOD CHECKING FOR VEHICLE STEERING ANGLE SENSOR; and U.S. patent application Ser. No. 12/860,418, filed on Aug. 20, 2010 and entitled GOOD CHECKING FOR VEHICLE YAW RATE SENSOR.

BACKGROUND

Modern vehicles include computer systems for controlling engine emissions, vehicle braking, and a variety of other items. The systems require data in order to function, such as oxygen level data for controlling engine emissions and wheel speed data for controlling braking. This data is generally supplied by sensors located throughout the vehicle. To ensure the integrity of the data provided by the sensors, controllers perform malfunction testing on the sensors (or the signals or data the sensors provide). If a sensor malfunction is detected (in other words, there is an error in the sensor output or sensor data), a warning light or similar indicator can be activated.

SUMMARY

While current vehicle systems are designed to monitor the functioning or operation of vehicle sensors and determine when a sensor malfunction occurs, such systems lack, at least in general, robust abilities for determining when the sensor malfunction ends. For example, a sensor malfunction might be caused by a powerful source of electromagnetic interference ("EMI"). Such a circumstance might occur if a vehicle passes near an electrical power generation plant, a radar or broadcast installation, or similar location. Once the vehicle moves outside the range of the EMI, the output from the sensor might return to within an acceptable range. However, in many vehicles, once a sensor malfunction occurs, the only way in which the malfunction or error may be cleared is to have a mechanic or technician access the system, check its operation, and perform an act that resets the system or otherwise removes the error.

A check of the sensor signal based on a re-detection by the failure monitoring function can be used as a mechanism to determine if a sensor has returned to normal operation. However, "good checking" is more than this. In general, malfunction monitoring functions are designed to avoid misdetection. On the other hand, "good check" functions are, in general, designed to avoid a false good check, i.e., a good check function has smaller tolerances for deviations and fewer conditions on the driving situation to perform the evaluation. Or, in other words, the tolerances and conditions used in good checking are different than those used to detect a malfunction.

Embodiments of the invention provide a mechanism for automatically determining whether a malfunctioning sensor has returned to a normal or acceptable operating range. In the parlance of the inventors, embodiments of the invention perform a "good check" on the sensor to determine whether the sensor has returned to normal or acceptable operation after a malfunction has been detected. When a previously-malfunctioning sensor passes the "good check," warning lights (or tell-tale) indicators are shut off and systems that relied upon information from the malfunctioning sensor return to normal operation.

In one embodiment, the invention provides a controller for determining whether a previously-detected, vehicle-sensor malfunction still exists. The controller includes an electronic, non-volatile memory and an electronic processing unit connected to the electronic, non-volatile memory. The electronic processing module includes a malfunction monitoring module, a failure handling module, and a signal checking module.

The malfunction monitoring module monitors the operation of a pressure sensor and generates a fault signal when the pressure sensor malfunctions. The fault signal contains fault information and causes a tell-tale indicator to be activated or a vehicle control system (such as an engine control system, traction control system, vehicle stability system or the like) to modify its operation from a first operating state to a second operating state. The failure handling module stores the fault information and corresponding drive cycle information in the electronic, non-volatile memory.

The signal checking module retrieves the drive cycle information from the electronic, non-volatile memory and performs a good check or signal check on information from the pressure sensor. The signal check verifies that a pressure sensor offset compensation function is active for a predetermined time and that a pressure sensor offset is less than a predetermined threshold. Alternatively, the signal check verifies that a test pulse on the pressure sensor completes successfully without generating a pressure sensor test pulse fault. If the pressure sensor passes the signal or good check, the signal checking module generates a reset signal that causes the tell-tale indicator to be deactivated, the vehicle control system to resume operation in the first operating state, or both.

In some embodiments, the signal checking module performs the first signal check on information from the pressure sensor by verifying that at least one pressure sensor offset compensation function is active for a predetermined active time and verifying that an offset value for the pressure sensor is less than a predetermined threshold. The signal checking module verifies that the at least one pressure sensor offset compensation function is active for the predetermined active time by verifying that a pressure sensor positive offset compensation function and a pressure sensor negative offset compensation function are active for the predetermined active time. The signal checking module performs the first signal check on the information from the pressure sensor by verifying that an absolute value of a difference between an actual value of the pressure sensor and the offset value for the pressure sensor is less than a predetermined failure amount. The signal checking module performs the first signal check on information from the pressure sensor while a vehicle monitored by the pressure sensor is traveling substantially forward on a substantially straight path. The signal checking module generates a reset signal if the pressure sensor passes the first signal check, the reset signal configured to cause at least one of the first tell-tale indicator to be deactivated and the first vehicle control system to resume operation in the first operating state.

In some embodiments, the malfunction monitoring module is configured to monitor the operation of a brake light switch and generate a second fault signal if the brake light switch malfunctions, the second fault signal containing second fault information and configured to cause at least one of a second tell-tale indicator to be activated and a second vehicle control system to modify its operation from a first operating state to a second operating state.

In some embodiments, the failure handling module causes second drive cycle information and second fault information to be stored in the electronic, non-volatile memory.

In some embodiments, the signal checking module retrieves the second drive cycle information and the second fault information from the electronic, non-volatile memory, performs a second signal check on information from the brake light switch, and if the pressure sensor passes the first signal check and the brake light switch passes the second signal check, generating a reset signal, the reset signal configured to cause at least one of the second tell-tale indicator to be deactivated and the second vehicle control system to resume operation in the first operating state. The signal checking module performs the second signal check on the information from the brake light switch by verifying that the brake light switch exhibits a predetermined pattern. The predetermined pattern includes a low signal for a predetermined time, then a high signal for a predetermined time, and then a second low signal for a predetermined time. The signal checking module performs the first signal check on the information from the pressure sensor by verifying that a pressure sensor test pulse completes successfully without generating a pressure sensor test pulse fault. The signal checking module performs the first signal check on the information from the pressure sensor while a vehicle monitored by the pressure sensor is traveling substantially forward on a substantially straight path or the vehicle monitored by the pressure sensor is substantially stationary.

In another embodiment, the invention provides a controller for determining whether a previously-detected, vehicle-sensor malfunction still exists. The controller includes an electronic, non-volatile memory and an electronic processing unit connected to the electronic, non-volatile memory. The electronic processing module includes a malfunction monitoring module, a failure handling module, and a signal checking module. The malfunction monitoring module monitors the operation of a pressure sensor and a brake light switch and generates a fault signal when the pressure sensor and the brake light switch malfunction. The fault signal contains fault information and causes a tell-tale indicator to be activated or a vehicle control system to modify its operation from a first operating state to a second operating state. The failure handling module stores the fault information and corresponding counter or cycle information (referred to as "drive cycle" information) in the electronic, non-volatile memory.

The signal checking module retrieves the drive cycle information from the electronic, non-volatile memory and performs a signal check on both the pressure sensor and the brake light switch. The signal check executed on the pressure sensor verifies that a pressure sensor offset compensation function is active for a predetermined time and that a pressure sensor offset is less than a predetermined threshold. The signal check executed on the brake light switch verifies that the brake light switch exhibits a predetermined pattern. If the pressure sensor and the brake light switch each pass their signal checks, the signal checking module generates a reset signal that causes the tell-tale indicator to be deactivated, causes the vehicle control system to resume operation in the first operating state, or both.

Other embodiments of the invention provide a method, executed by a controller including an electronic processing unit and an electronic, non-volatile memory, for determining whether a previously-detected, vehicle-sensor malfunction still exists. The method includes monitoring (with a malfunction monitoring module executed by the electronic processing unit) the operation of at least one of a pressure sensor and a brake light switch and generating a fault signal (containing fault information) when at least one of the pressure sensor and the brake light switch malfunctions. The method also includes activating a tell-tale indictor or modifying the operation of a vehicle control system from a first operating state to a second operating state when the fault signal is generated. In addition, the method includes storing the fault information and corresponding drive cycle information in the electronic, non-volatile memory using a failure handling module executed by the electronic processing unit.

The method also includes retrieving the drive cycle information and performing a signal check on information from at least one of the pressure sensor and the brake light switch. Performing a signal check on the pressure sensor includes verifying that a pressure sensor offset compensation function is active for a predetermined time and that a pressure sensor offset is less than a predetermined threshold or verifying that a pressure sensor pulse test completes successfully without generating a pressure sensor test pulse fault. Performing a signal check on the brake light switch includes verifying that the brake light switch exhibits a predetermined pattern. If at least one of the pressure sensor and the brake light switch pass their signal checks, a reset signal is generated by the signal checking module. The reset signal causes the tell-tale indicator to turn off, the vehicle control system to resume operation in the first operating state, or both.

In some embodiments, performing the signal check includes verifying that at least one pressure sensor offset compensation function is active for a predetermined active time and verifying that an offset value for the pressure sensor is less than a predetermined threshold. Verifying that at least one pressure sensor offset compensation function is active for the predetermined active time includes verifying that a pressure sensor positive offset compensation function and a pressure sensor negative offset compensation function are active for the predetermined active time. Performing the signal check includes verifying that an absolute value of a difference between an actual value of the pressure sensor and the offset value for the pressure sensor is less than a predetermined failure amount. Performing the signal check includes verifying that a pressure sensor test pulse completes successfully without generating a pressure sensor test pulse fault. Performing the signal check includes verifying that the brake light switch exhibits a predetermined pattern. Verifying that the brake light switch exhibits a predetermined pattern includes verifying that the brake light switch generates a low signal for a predetermined time, then a high signal for a predetermined time, and then a second low signal for a predetermined time. Performing the signal check includes performing the signal check while a vehicle monitored by the pressure sensor and the brake light switch is traveling substantially forward on a substantially straight path or is substantially stationary.

Other aspects of the invention will become apparent by consideration of the detailed description and accompanying drawings.

DETAILED DESCRIPTION

Figure 1:
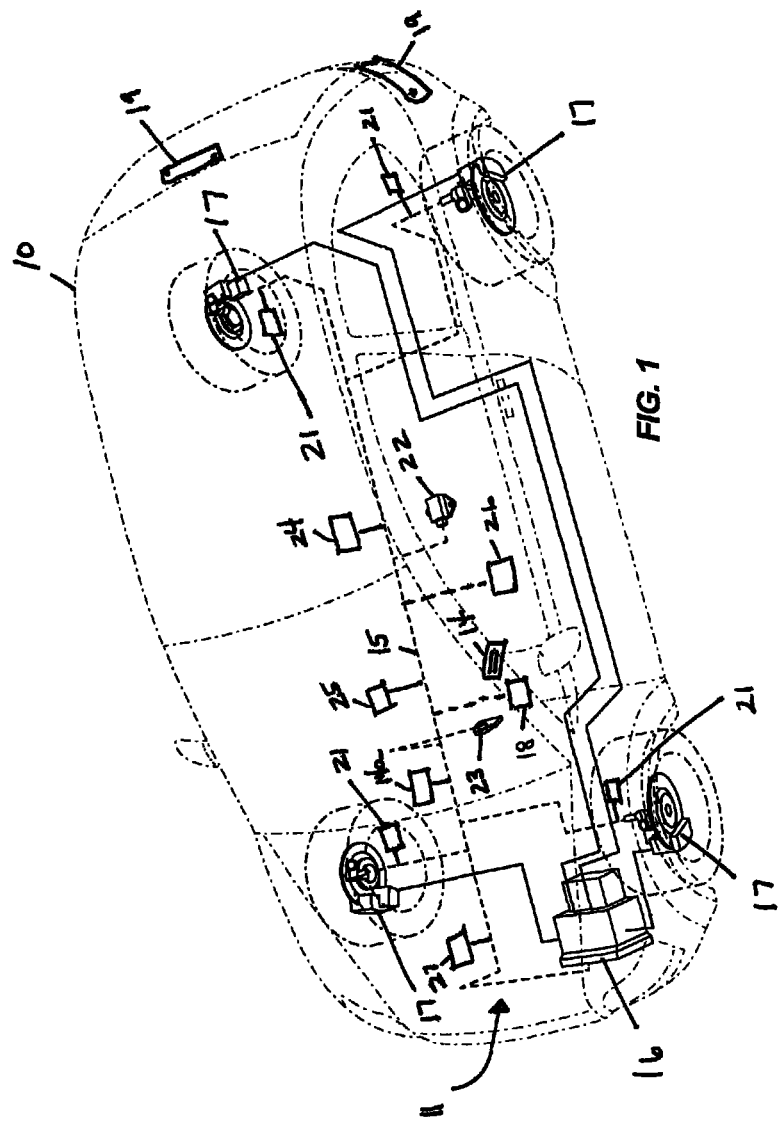
FIG. 1 is a perspective view of a vehicle including a vehicle control system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention. Alternative configurations are possible.

FIG. 1 illustrates a vehicle 10 including a vehicle control system 11. The vehicle control system 11 includes a brake pedal 14. A pressure sensor ("PS") 14a is associated with a master cylinder of a hydraulic brake system and senses the amount of pressure in the brake system. The amount of pressure in the brake system is dependent upon actuation of the brake pedal 14, in the sense that "lightly tapping" the brake pedal 14 causes relatively little pressure to be applied to the brakes, whereas "stomping" on the pedal cause a relatively large amount of pressure to be applied to the brakes. Information output by the pressure sensor 14a is transmitted over a connection or network, such as a controller area network ("CAN") bus 15. Other components connected to the bus 15 may receive the information from the pressure sensor 14 and use that information to control other aspects of the vehicle 10. For example, a controller 16 receives information from the pressure sensor 14a over the bus 15. In some embodiments, the controller 16 provides electronic stability control ("ESC") functionality. For example, when the controller 16 detects a loss of steering control (e.g., understeer or oversteer), the controller 16 automatically applies one or more individual brakes 17 to help steer the vehicle 10 in a desired direction. In some embodiments, the controller 16 also reduces engine power when it detects a skid or slide of the vehicle 10 until the vehicle operator regains control of the vehicle 10.

As shown in FIG. 1, the vehicle control system 11 also includes a brake light switch ("BLS") 18. The BLS 18 is wired to one or more brake lights 19 (wiring not shown). When an operator presses down the brake pedal 14, the pedal 14 presses down and creates contact with the BLS 18, which completes a circuit between the brake lights 19 and a power source, such as the vehicle's battery (not shown). With the circuit completed, the brake lights 19 are illuminated.

The BLS 18 is also connected to the bus 15 and sends information to other components also connected to the bus 15, such as the controller 16. The BLS 18 sends information over the bus 15 indicating whether the circuit between the BLS 18 and the brake lights 19 is complete (i.e., whether the brake lights are illuminated). For example, if the circuit is complete and the brake lights are being illuminated, the BLS 18 outputs a power or "high" signal to the bus 15. Alternatively, if the circuit is incomplete and the brake lights 19 are not being illuminated, the BLS 18 outputs a no-power or "low" signal to the bus 15.

As shown in FIG. 1, the control system 11 includes the controller 16, the bus 15, and a plurality of sensors. The sensors can include one or more wheel speed sensors 21, a yaw rate sensor 22, a steering sensor 23, a pitch sensor 24, a roll sensor 25, a longitudinal acceleration sensor 26, a lateral acceleration sensor 27, the brake light switch 18, and the brake pressure sensor 14a.

Figure 2:
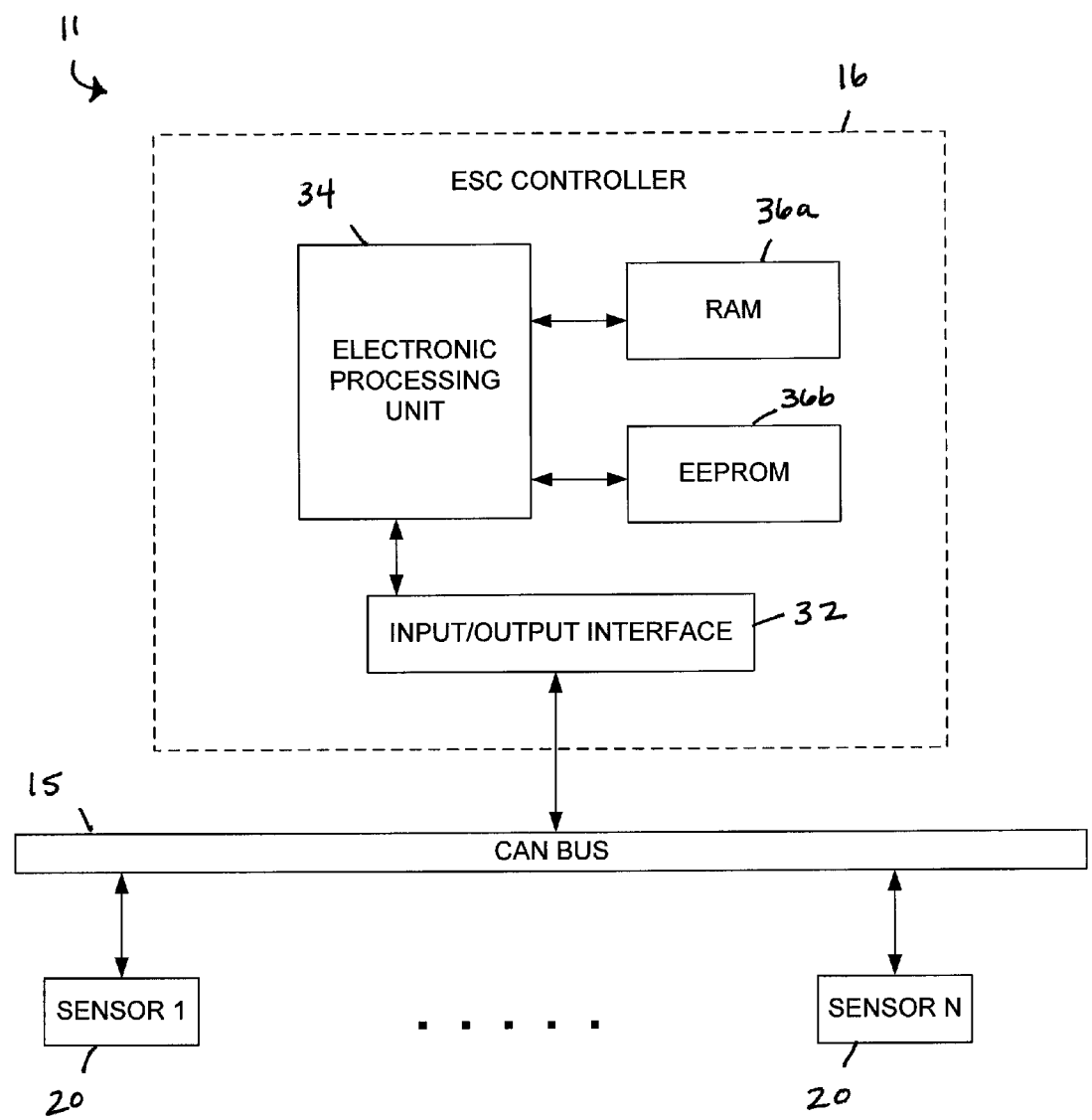
FIG. 2 schematically illustrates the vehicle control system of FIG. 1 according to one embodiment of the invention.

FIG. 2 schematically illustrates the vehicle control system 11 of FIG. 1 in greater detail. The numerous sensors depicted in FIG. 1 are represented generally by boxes 20 (Sensor 1 . . . Sensor N). As also shown in FIG. 2, the controller 16 includes an input/output interface 32, an electronic processing unit ("EPU") 34, and one or more memory modules, such as a random access memory ("RAM") module 36a and an electronically erasable programmable read-only memory ("EEPROM") module 36b. As shown in FIG. 2, the input/output interface 32 transmits and/or receives information over the bus 15. In other embodiments, the input/output interface 32 transmits and/or receives information directly to and/or from the sensors 20 rather than over the bus 15.

The EPU 34 receives the information from the input/output interface 32 and processes the information by executing one or more applications or modules. The applications or modules are stored in memory (such as EEPROM 36b). The EPU 34 also stores information (e.g., information received from the bus 15 or information generated as a result of executing instructions) in memory. For example, as described below, the EPU 34 stores drive cycle information and fault information in the EEPROM 36b.

Figure 3:
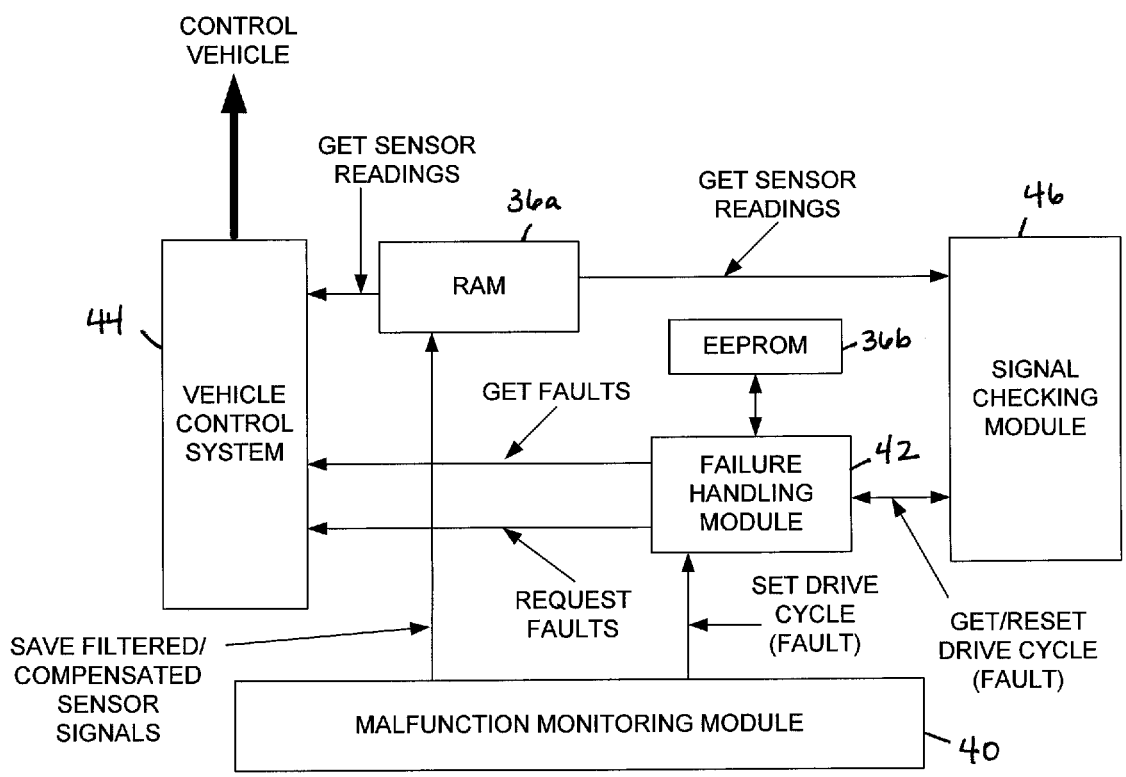
FIG. 3 schematically illustrates the functional operation of modules of the vehicle control system of FIG. 2 according to one embodiment of the invention.

FIG. 3 illustrates the functional operation of applications or modules executed by the EPU 34 of the controller 16. As shown in FIG. 3, the EPU 34 executes a malfunction monitoring module 40, a failure handling module 42, a vehicle control system 44 (such as an electronic stability control ("ESC") program or application), and a signal checking module 46. The malfunction monitoring module 40 receives sensor signals from the sensors 20 over the bus 15 (e.g., through the input/output interface 32) and saves the sensor signals to memory. As shown in FIG. 3, the malfunction monitoring module 40 saves filtered and/or compensated sensor signals to memory rather than raw data. For example, over time a sensor 20 may become dirty or damaged, which can affect the sensor's operation. The malfunction monitoring module 22 applies an offset (positive or negative) to the signals received from a particular sensor 20 to compensate for the sensor's deterioration and stores the compensated sensor signal to memory. As described below, if a particular sensor's offset gets too large (in either the positive or the negative direction), the malfunction monitoring module 40 determines that the sensor 20 is malfunctioning or faulty and generates a fault signal. The malfunction monitoring module 22 also saves additional information to memory, such as sensor offsets, detected faults, and other statistical information about a particular sensor (e.g., an average sensor reading, a median sensor reading, etc.).

The main function or purpose of the malfunction monitoring module 40 is to determine if a particular sensor is malfunctioning or faulty. For example, as mentioned above, if a sensor's offset becomes too large, the malfunction monitoring module 40 may determine that the sensor 20 is malfunctioning. A variety of other algorithms and techniques for determining whether a sensor is malfunction can also be used including those disclosed in, for example, U.S. Pat. No. 6,834,221. As shown in FIG. 3, when the malfunction monitoring module 40 detects a malfunctioning or faulty sensor, the module 40 generates a fault signal and sends the fault signal to the fault handling module 42. The fault signal includes fault information based on the particular fault or malfunction observed by the malfunction monitoring module 40. The failure handling module 42 stores the fault information and corresponding counter information, (which is referred to as "drive cycle information") in memory. The drive cycle information indicates what tests should be performed by the signal checking module 46 during the next drive cycle (e.g., the next time during which malfunction testing is performed) to determine whether a previously-detected fault still exists. For example, if the malfunction monitoring module 40 detects that the pressure sensor 14a is malfunctioning and generates a fault signal, the fault handling module 42 saves drive cycle information to memory indicating that the signal checking module 46 should check the pressure sensor 14a during a subsequent cycle to determine whether the previously-detected pressure sensor fault still exists.

As shown in FIG. 3, the vehicle control system 44 requests the currently-detected faults from the failure handling module 42. The failure handling module 42 retrieves the stored fault information from memory and sends the fault information to the vehicle control system 44. In other embodiments, the vehicle control system 44 obtains currently-detected faults from the malfunction monitoring module 40, the RAM 36a, the bus 15, or other components included in the system 11.

After obtaining them, the vehicle control system 44 determines how to handle the current faults. In some embodiments, the vehicle control system 44 activates one or more warning lights or tell-tales in the vehicle 10 (e.g., on the vehicle's dashboard or instrument panel) in response to the currently-detected faults. In some applications, the warning lights or tell-tales provide information to the vehicle operator regarding the one or more faulty sensors 20. In other applications, the warning lights or tell-tales provide information about a vehicle system. For example, if a faulty brake pressure sensor is detected, the vehicle may activate a warning light regarding the anti-lock braking system rather than activating a specific warning light regarding the brake pressure sensor. Thus, the warning light or tell tale may only provide general information to the driver regarding the existence of a fault, whereas the control system 44 knows the specific nature of the fault.

Although not strictly required, in almost all instances the vehicle control system 44 modifies its operation in response to faults determined by the malfunction monitoring module 40 in addition to activating a warning light or tell tale. For example, if a particular sensor 20 is malfunctioning, the vehicle control system 44 changes its operation from a first operating state (e.g., ON) to a second operating state (e.g., OFF). In the first or "normal" operating state, the vehicle control system 44 operates as intended or programmed using all the data it receives from the sensors 20. In the second operating state, the vehicle control system turns itself off (as noted) or, alternatively, operates in a state where information from faulty sensors is ignored, but control is still provided based on information from the remaining, non-malfunctioning sensors. Yet another option is for the vehicle control system 44 to operate in a manner in which some of its functionality or features are reduced. The factors determining the exact parameters of the second state of operation of the vehicle control system is a measure of the criticality or importance of the information provided by the malfunctioning sensor. For example, information from a yaw rate sensor may be critical to certain vehicle control functions (such as ESC), but may be unimportant or less critical to others (such as traction control). Thus, if a yaw rate sensor malfunction is detected, traction control may continue to function based on information from other sensors, but ESC might be turned off. If the vehicle control system 44 deactivates or modifies its functionality or other types of vehicle control or monitoring functionality, the vehicle control system 44 can activate one or more warning lights or tell-tales that warn the vehicle operator of the modified operating state.

The signal checking module 46 retrieves drive cycle information stored in the EEPROM 36b and performs various good checks or signal checks to determine whether a previously-detected sensor malfunction still exists. In some embodiments, the signal checking module 46 is initialized during each new ignition cycle and retrieves the stored drive cycle information upon each initialization. In other embodiments, the signal checking module 46 retrieves stored drive cycle information from memory at various times while the controller 16 is operating.

Performing a signal check includes testing current readings or information from a particular sensor 20. Therefore, the signal checking module 46 obtains current sensor readings from memory, the bus 15, the malfunction monitoring module 40, or from other components of the system 11. The current sensor readings include compensated or filtered sensor signals or information, raw sensor information, current sensor offsets, and/or other statistical information about a particular sensor 20. Once the signal checking module 46 obtains current sensor readings, the module 46 compares the information to one or more thresholds to determine whether a previously-detected fault still exists. The signal checking module 46 can also execute a test on a sensor by sending information to a sensor and observing the response.

If the signal checking module 46 determines that a previously-detected fault doesn't exist anymore, the module 46 resets the corresponding fault information and/or drive cycle information in memory. The signal checking module 46 resets the drive cycle information by generating a reset signal. The failure handling module 42 receives the reset signal and updates the fault information and/or drive cycle information stored in memory to indicate that the previously-detected fault no longer exists (e.g., by deleting the previous fault and/or drive cycle information or setting a fault bit or flag to an "okay" or "no fault" value). When the vehicle control system 44 subsequently requests the current faults from the failure handling module 42, the failure handling module 42 informs the vehicle control system 44 that the previously-detected fault no longer exists (e.g., by failing to list the fault as one of the current faults). The vehicle control system 44 re-assesses the current faults and, in some embodiments, deactivates a previously-activated warning light or tell-tale within the vehicle 10 and/or returns its operation back to a first or original operating state (e.g., an ON state).

On the other hand, if the signal checking module 46 determines that the previously-detected fault still exists, the signal checking module 46 sets the corresponding fault and/or drive cycle information in memory. By setting the corresponding fault and/or drive cycle information in memory, the signal checking module 46 ensures that the stored fault information and/or drive cycle information continues to indicate that the fault exists so that (1) the vehicle control system 44 is informed of the existence of the fault and (2) the signal checking module 46 will run another signal check on the fault during subsequent operation. The signal checking module 46 sets the fault and/or drive cycle information by generating a set signal. The failure handling module 42 receives the set signal and ensures that the fault information and/or drive cycle information in memory continues to indicate that the fault still exists. In other embodiments, the signal checking module 46 simply fails to reset the fault and/or drive cycle information (e.g., fails to generate and output a reset signal), which retains the fault and/or drive cycle information in the same state as before the signal checking module 46 performed its signal checks.

Figure 4:
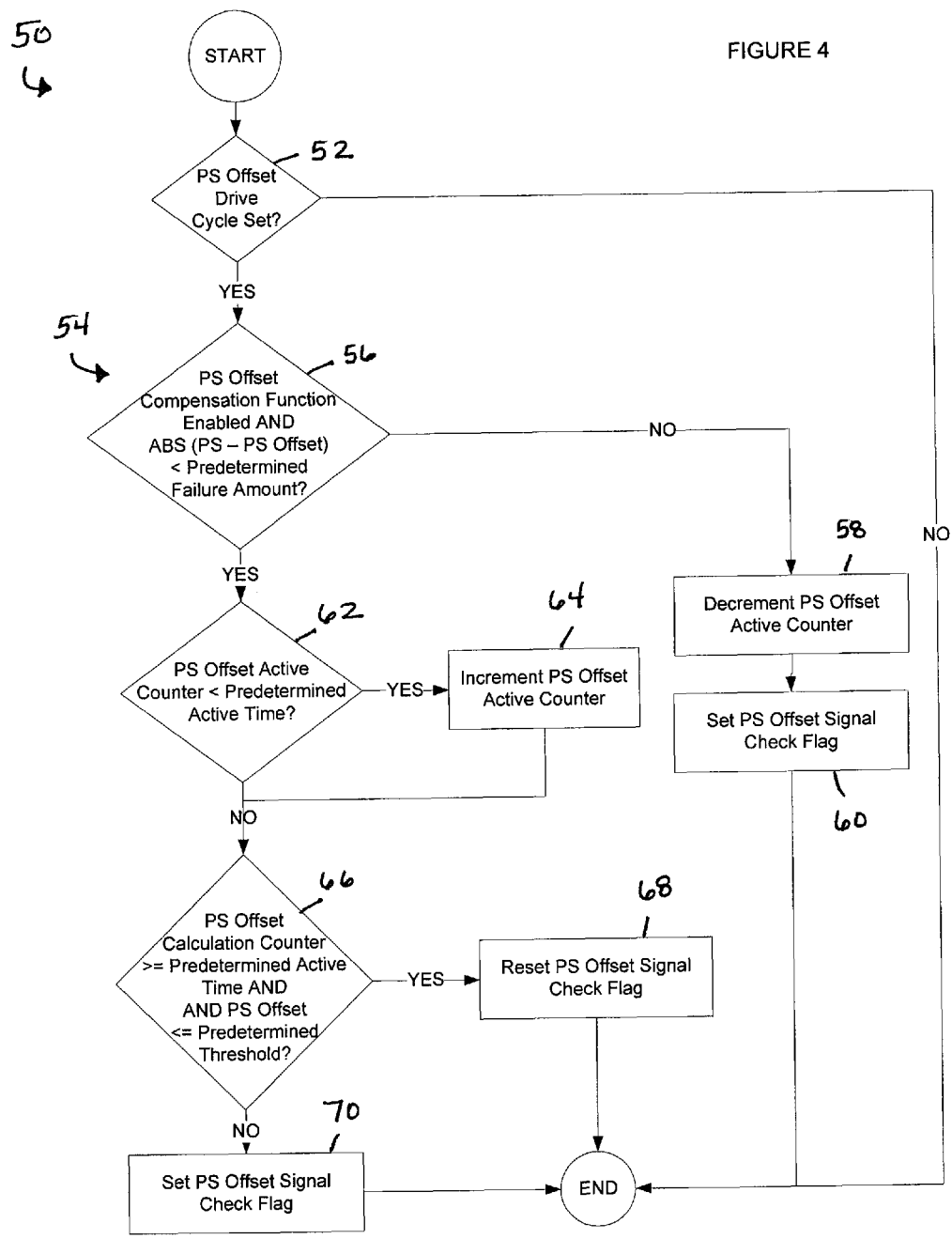
FIG. 4 illustrates a first pressure sensor signal check performed by the signal checking module of FIG. 3 according to one embodiment of the invention.

FIG. 4 illustrates a first pressure sensor signal check 50 performed by the signal checking module 46 after the malfunction monitoring module 40 detects, for example, a pressure sensor offset malfunction. As described above, a pressure sensor offset malfunction occurs when an offset for the pressure sensor ("pressure sensor offset") becomes greater than a predetermined threshold. In some embodiments, when the malfunction monitoring module 40 detects a pressure sensor offset malfunction, an anti-lock braking system ("ABS") warning light and an ESC failure tell-tale are illuminated.

As shown in FIG. 4, the first step of the first pressure sensor signal check includes determining whether the retrieved drive cycle information includes drive cycle information for a pressure sensor offset malfunction (step 52). The retrieved drive cycle information can include a flag or bit (e.g., a pressure sensor offset drive cycle bit or flag) that is set if a pressure sensor offset malfunction is detected by the malfunction monitoring module 40. If this flag is not set, the signal checking module 46 ends the signal check 50.

If this flag is set, the signal checking module 46 executes a first pressure sensor test 54 (e.g., a pressure sensor offset test). Generally, the first pressure sensor test 54 determines whether one or more pressure sensor offset compensation functions have been active for a predetermined time and whether a current pressure sensor offset is less than a predetermined threshold. For example, as shown in FIG. 4, step 56 includes determining whether one or more pressure sensor offset compensation functions are active. In some embodiments, this step includes determining whether a positive pressure sensor offset compensation function and a negative pressure sensor offset compensation function are active. The malfunction monitoring module 40 enables these pressure sensor offset compensation functions after certain operations of the vehicle 10, such as after the vehicle is driven with a predetermined minimum acceleration. The signal checking module 46 uses information obtained from memory and/or the malfunction monitoring module 40 to determine whether the required offset compensation functions are active.

As part of the initial step 56, the signal checking module 46 also verifies that the absolute value of the difference between a current sensor reading from the pressure sensor 14a and a current pressure sensor offset is less than a predetermined failure amount (e.g., 0 to 100 bar, which varies based on the characteristics of the vehicle). By performing this check, the signal checking module 46 verifies that the pressure sensor offset has not grown as large as or larger than the actual pressure sensor readings. For example, if the pressure sensor's current sensor reading is 4 bar and the current pressure sensor offset is 7 bar (causing the compensated sensor signal output by the malfunction monitoring module 40 to be approximately 11 bar), the pressure sensor 14a is probably still malfunctioning because its offset is greatly changing its current sensor readings. This large offset probably indicates that the pressure sensor 14a is still malfunctioning and, therefore, needs to be serviced or replaced.

As shown in FIG. 4, if the signal checking module 46 determines that the proper pressure sensor offset compensation functions are not active or determines that a current pressure sensor reading and a current pressure sensor offset differ by at least the predetermined failure amount, the signal checking module 46 ends the first pressure sensor signal check 50. Before ending the first pressure sensor signal check 50, the module 46 decrements a pressure sensor offset active counter at step 58. As described below in more detail, the pressure sensor offset active counter tracks how long a pressure sensor offset compensation function has been active. The signal checking module 46 also sets a pressure sensor offset signal check flag at step 50 before ending the signal check 50. In some embodiments, the signal checking module 46 sets the pressure sensor offset signal check flag by generating a set signal. The failure handling module 42 receives the set signal and ensures that the stored fault information and/or drive cycle information continue to indicate that the pressure sensor offset malfunction exists.

Alternatively, if the signal checking module 46 determines that the proper pressure sensor offset compensation functions are active and the current pressure sensor reading and the current pressure sensor offset differ by less than the predetermined failure amount (step 56), the signal module 46 determines whether the proper pressure sensor offset compensation functions have been active for at least a predetermined active time (e.g., 0 to 120 seconds, which varies depending on the characteristics of the vehicle). As described above, the signal checking module 46 uses a pressure sensor offset active counter to track how long a compensation function has been active. The active counter is initialized to 0 seconds when a pressure sensor offset compensation function is activated and the signal checking module 46 or another component in the system 11 increments and decrements the counter accordingly.

If the pressure sensor offset active counter is set to less than the predetermined active time (step 62), the checking module 46 increments the counter (step 64). Next, the signal checking module 46 determines if the counter is set to at least the predetermined active time (step 66). If so, the signal checking module 46 also checks if the current pressure sensor offset is less than or equal to a predetermined threshold (e.g., 0 to 100 bar, which varies based on the characteristics of the vehicle) (step 66). If both conditions of step 66 are satisfied, the signal checking module 46 concludes that the previously-detected pressure sensor offset malfunction no longer exists. In other words, if the malfunction monitoring module 40 has been actively calculating an offset for the pressure sensor 14a for at least the predetermined active time and the current pressure sensor offset is less than the predetermined threshold, the signal checking module 46 concludes that a pressure sensor offset malfunction no longer exists.

As shown in FIG. 4, if the signal checking module 46 determines that the pressure sensor offset malfunction no longer exists, the signal checking module 46 resets a pressure sensor offset signal check flag to indicate that the previously-detected malfunction no longer exists (step 68). In some embodiments, the signal checking module generates a reset signal to complete this step. The failure handling module 42 receives the reset signal and ensures that the fault information and/or drive cycle information stored in memory no longer indicate that a pressure sensor offset malfunction exists. When the vehicle control system 44 subsequently requests the current faults from the failure handling module 42 (as described above with respect to FIG. 3), the vehicle control system 44 will be informed that the pressure sensor offset malfunction no longer exists. Based on this updated information, the vehicle control system 44 responds. It deactivates a warning light or a tell-tale and/or modifies its operation back to a first or original operating state (e.g., an active and fully functional state), or both. After resetting the pressure sensor offset signal check flag at step 68, the signal checking module 36 ends the first pressure sensor signal check 50.

On the other hand, as shown in FIG. 4, if the signal checking module 46 determines that the pressure sensor offset malfunction still exists (i.e., fails step 66), the signal checking module 46 sets the pressure sensor offset signal check flag at step 70, as described above for step 60, and ends the first pressure sensor signal check 50.

Figure 5:
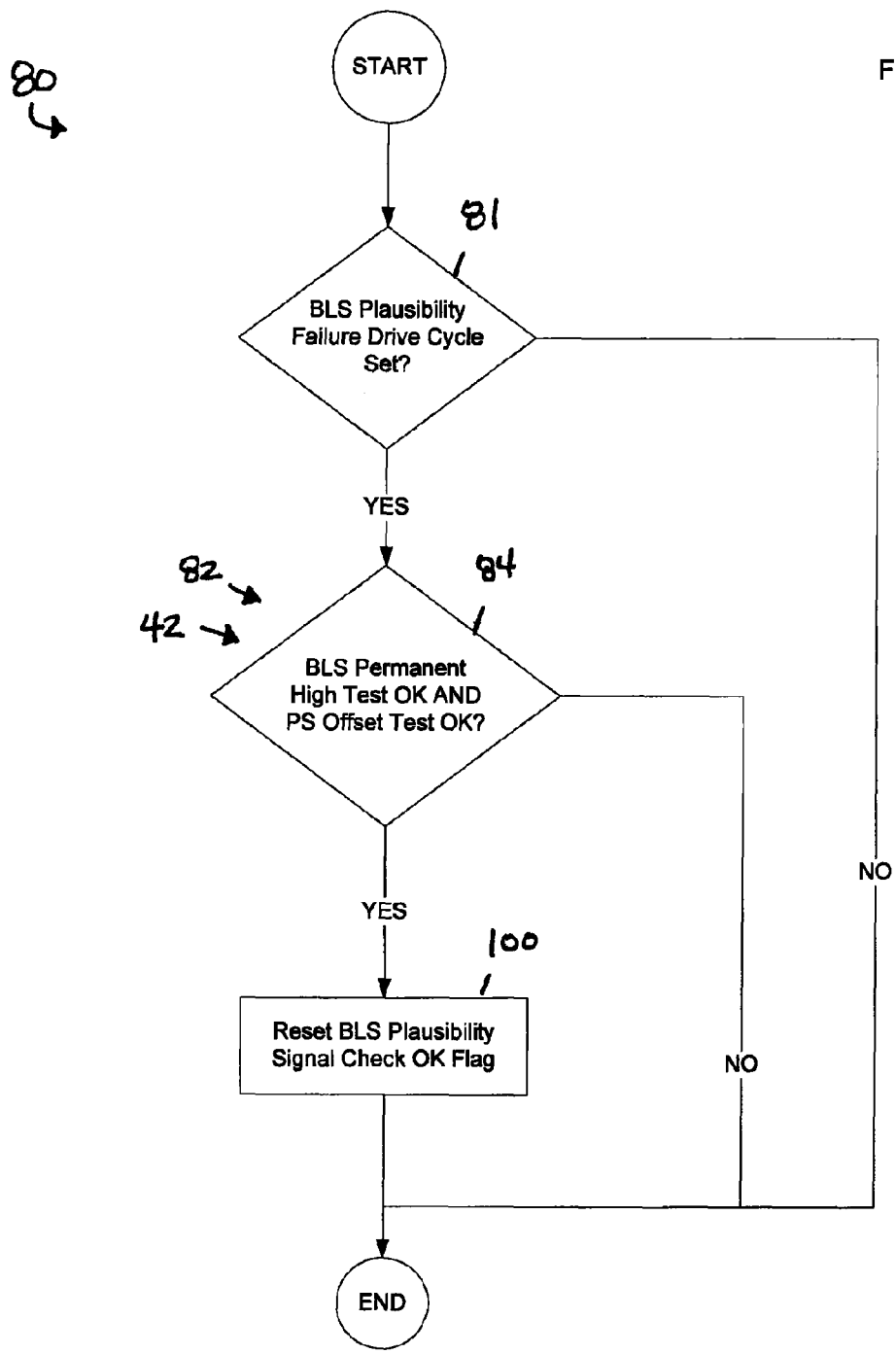
FIG. 5 illustrates a second pressure sensor signal check performed by the signal checking module of FIG. 3 according to another embodiment of the invention.

FIG. 5 illustrates a second pressure sensor signal check 80 performed by the signal checking module 46. The signal checking module 46 executes the signal check 80 after the malfunction monitoring module 40 detects, for example, a pressure sensor offset malfunction, as described above with respect to FIG. 4, and a BLS permanent high malfunction. A BLS permanent high malfunction occurs when the malfunction monitoring module 40 determines that the BLS 18 has been outputting a "high" signal for a predetermined time. In some embodiments, when the malfunction monitoring module 40 detects a pressure sensor offset malfunction and a BLS permanent high malfunction, an ABS warning light and an ESC failure tell-tale are illuminated.

As shown in FIG. 5, the first step of the second pressure sensor signal check 80 includes determining whether the retrieved drive cycle information specifies that a pressure sensor offset malfunction and BLS permanent high malfunction have occurred (step 81). The retrieved drive information can includes a flag or bit (e.g., a BLS plausibility failure drive cycle bit or flag) that is set accordingly. If this flag is not set, the signal checking module 46 ends the signal check 80. If this flag is not set, the signal checking module 46 ends the signal check 80. If this flag is set, the signal checking module 46 executes (1) a first BLS test 82 (e.g., a BLS permanent high test) and (2) the first pressure sensor test 54, as described above with respect to FIG. 4 (step 84).

Figure 6A:
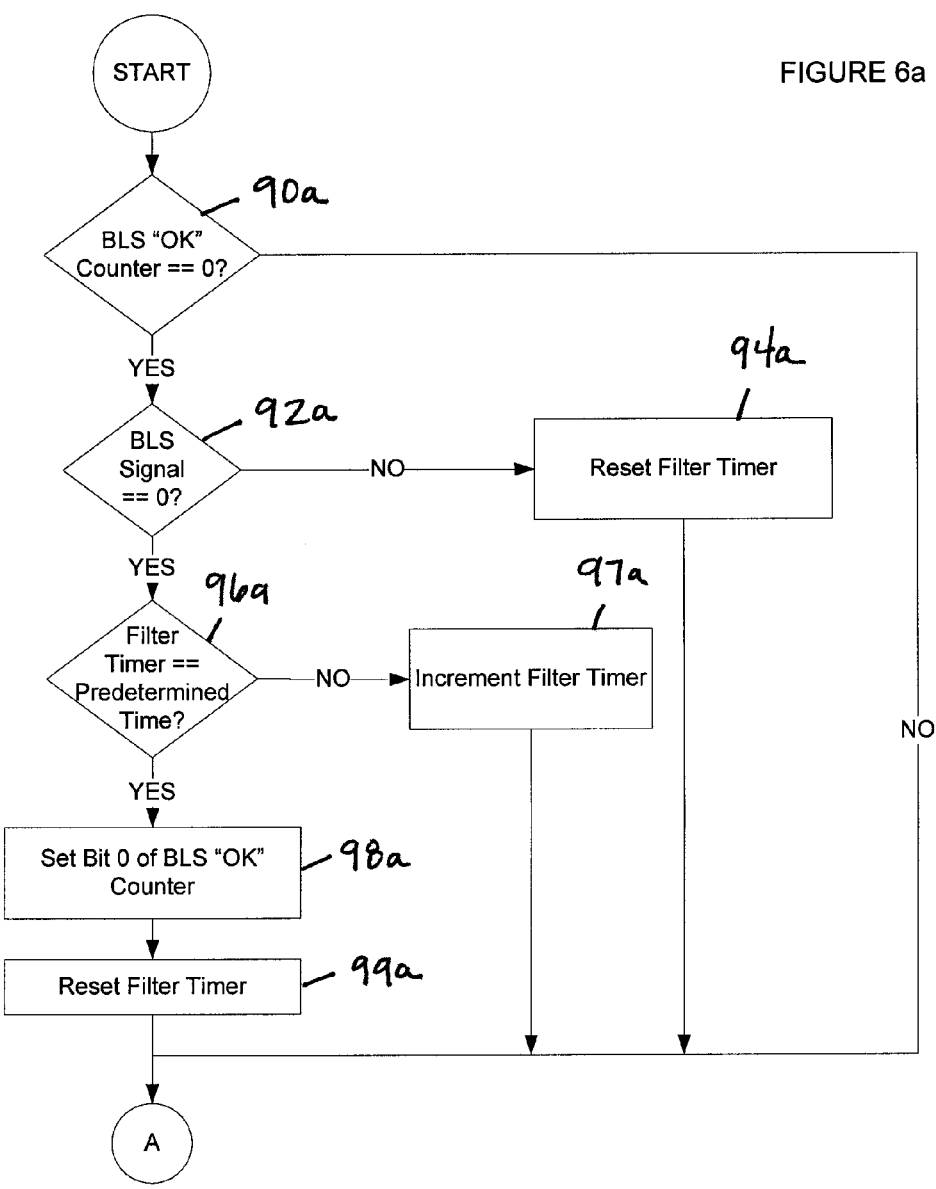
FIGS. 6a-c illustrate a first brake light switch test of FIG. 5 according to one embodiment of the invention.
Figure 6B:
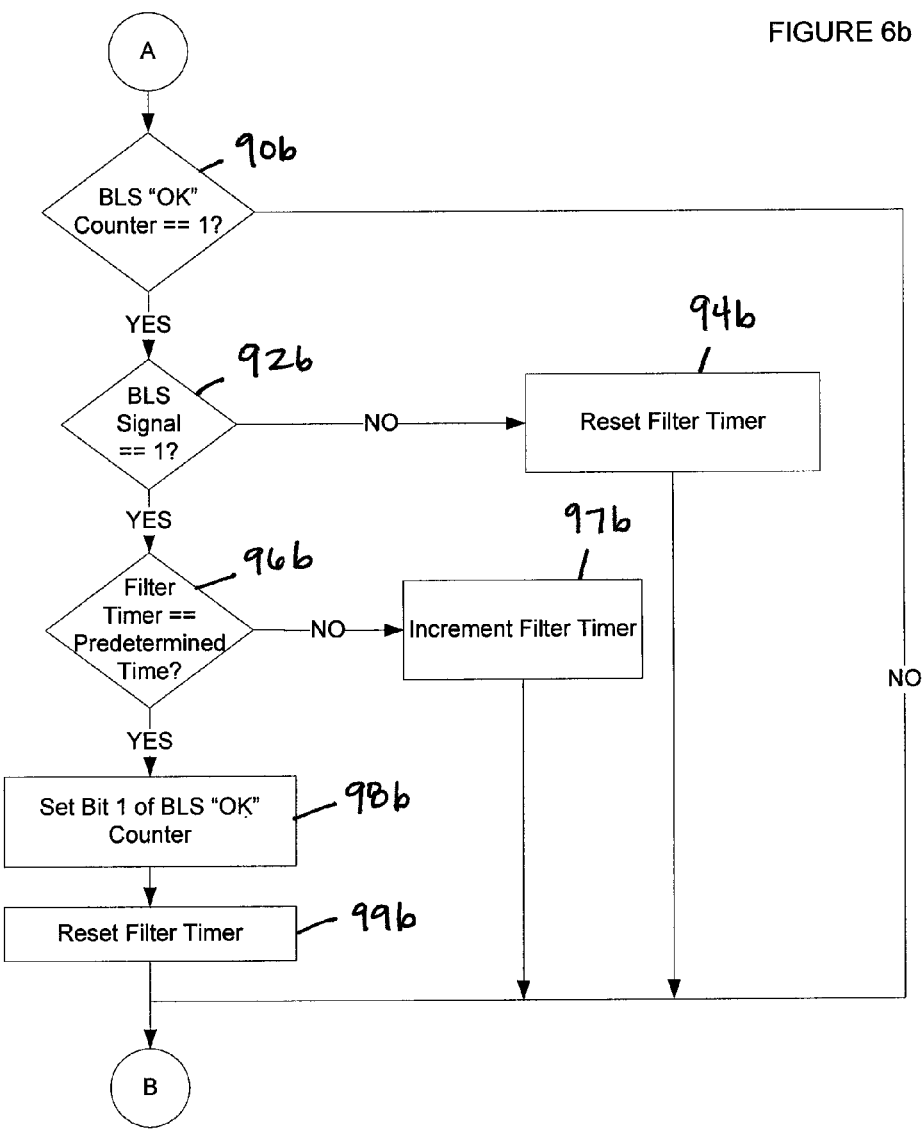
Figure 6C:
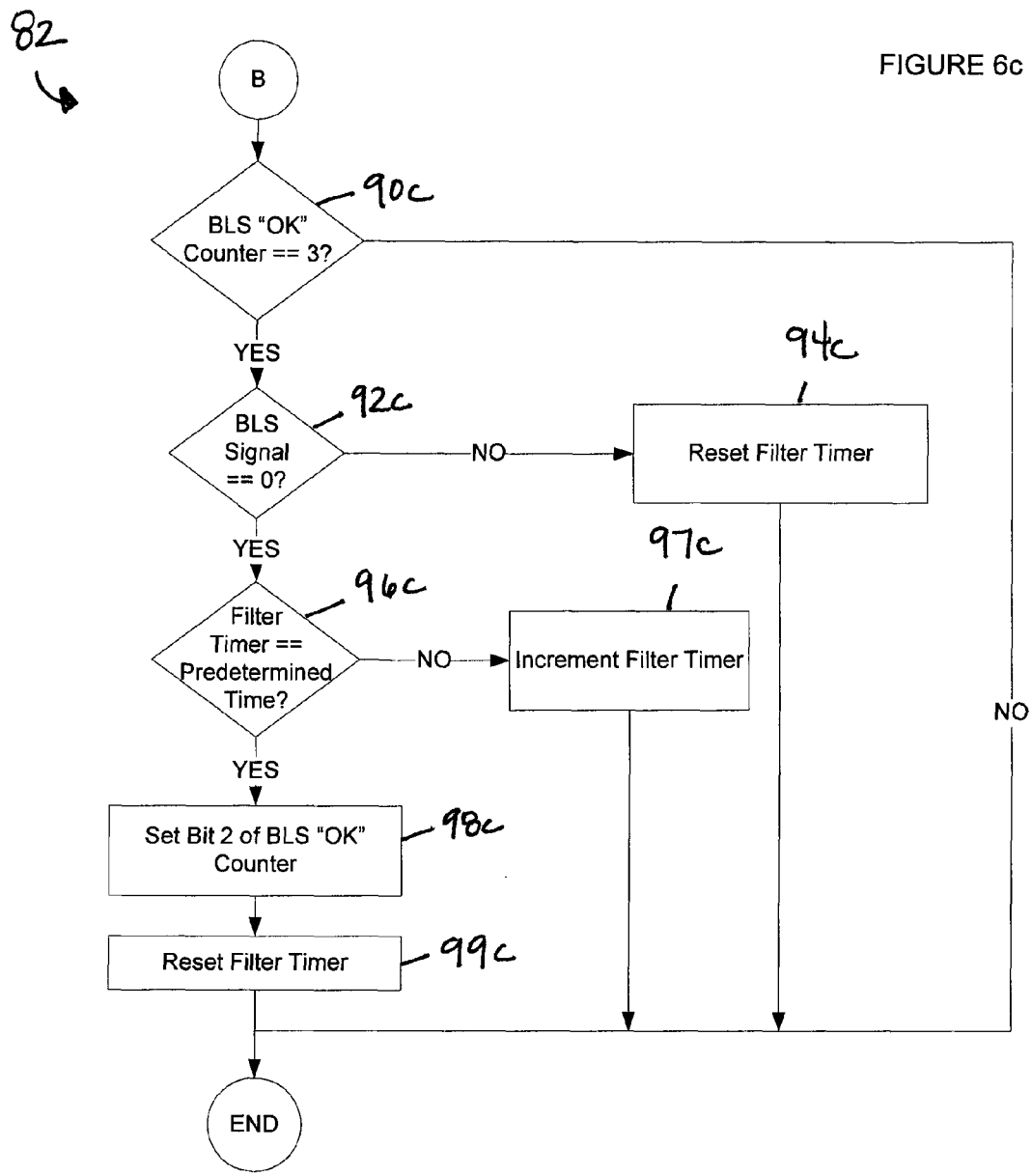

FIGS. 6*a*-*c* illustrate the first BLS test 82, which determines whether the BLS 18 exhibits a predetermined pattern. The pattern includes a low signal, followed by a high signal, and followed by second low signal. It is to be understood that the second low signal may be substantially the same as the first signal or may vary therefrom. This particular pattern indicates that the BLS 18 is not stuck in a permanent high state. In some embodiments, the BLS 18 must exhibit each signal of the pattern for a predetermined time (e.g., 0 to 1 second, which varies based on the characteristics of the vehicle). The predetermined time may be the same for each signal of the pattern or may be different.

The signal checking module 46 uses a BLS "OK" Counter to detect the predetermined pattern. The BLS "OK" Counter includes a bit for each state of the predetermined pattern, and the signal checking module 46 sets each bit as it observes each state. Therefore, the BLS "OK" Counter includes 3 bits, wherein the bits represent whether the BLS 18 has demonstrated the first (low signal), second (high signal), and third (low signal) state of the desired pattern. Initially the BLS "OK" Counter bits is set to 000 (i.e., the decimal value of zero) to indicate that the BLS 18 has not yet demonstrated any of the states of the pattern. As the signal checking module 46 observes each state, the module 46 sets the corresponding bit. In particular, after the module 46 observes the first state of the pattern, the signal checking module 46 sets the first bit of the BLS "OK" Counter (i.e., bit 0) to "1," which sets the BLS "OK" Counter to a decimal value of 1. Similarly, after the module 46 observes the second state of the pattern, the module 46 sets the second bit of the BLS "OK" Counter (i.e., bit 1) to "1," which sets the BLS "OK" Counter to a decimal value of 3. Finally, after the module 46 observes the final state of the pattern, the module 46 set the third bit of the BLS "OK" Counter (i.e., bit 2) to "1," which sets the BLS "OK" Counter to a decimal value of 7.

FIG. 6*a* illustrates the portion of the first BLS test 82 that determines whether the BLS 18 is demonstrating the first state of the desired pattern (i.e., a low signal). The signal checking module 46 starts by determining if the BLS "OK" Counter is set to the decimal value of 0 (step 90*a*). If the BLS "OK" Counter is not set to 0, the signal checking module 46 has already observed at least one of the states of the desired pattern, and the signal checking module 46 proceeds to check for other states of the pattern (see FIGS. 6*b* and 6*c*).

If the BLS "OK" Counter does equal 0 (step 90*a*), the signal checking module 46 determines whether the BLS 18 is currently demonstrating a low signal (step 92*a*). If the BLS 18 is not currently outputting a low signal, the signal checking module resets a filter timer (step 94*a*) (whose function is described below) and ultimately exits the test 82. The test 82 may be subsequently re-initiated (e.g., in subsequent initiations of the signal checking module 46) to check for the first pattern state.

If, however, the BLS 18 is currently outputting a low signal (step 92*a*), the signal checking module 46 determines whether the BLS 18 has been outputting this signal for the predetermined time (step 96*a*). The signal checking module 46 uses a filter timer to track how long the BLS 18 outputs a particular signal. The filter timer is initially set to 0 when the test 82 is started and is reset after a particular pattern state is observed (see step 99*a*) or when a particular state is not initially observed (see step 94*a*). As shown in FIG. 6*a*, if the BLS 18 has not been outputting a low signal for at least the predetermined time, the signal checking module 46 increments the filter timer (step 97*a*) and ultimately exits the test 82.

However, if the BLS 18 has been outputting a low signal for at least the predetermined time (step 96*a*), the BLS 18 has satisfied the first state of the desired pattern and the signal checking module 46 sets a first bit (i.e., bit 0) of the BLS "OK" Counter to "1" (i.e., setting the BLS OK Counter to the decimal value of 1) (step 98*a*). In addition, the signal checking module 46 resets the filter timer (step 99*a*) and proceeds to check for the second state of the desired pattern (see FIG. 6*b*).

FIG. 6*b* illustrates the portion of the test 82 that determines whether the BLS 18 is outputting a high signal for at least the predetermined time and FIG. 6*c* illustrates the portion of the test 82 that determines whether the BLS 18 is outputting a low signal for at least the predetermined time. Because these portions of the test 82 are similar to the portion illustrated in FIG. 6*a*, the details are not described in detail.

Returning to FIG. 5, at step 84, after executing the first BLS test 82, the signal checking module 46 executes the pressure sensor offset test 42, as described above with respect to FIG. 4. If both tests 82, 42 are passed, the signal checking module 46 resets the BLS plausibility signal check flag to indicate that the previously-detected malfunctions of the BLS 18 and pressure sensor 14*a* no longer exist (step 100). To reset the BLS plausibility signal check flag, the signal checking module 46 generates a reset signal. The failure handling module 42 receives the reset signal and ensures that the fault information and drive cycle information stored in memory no longer indicate that a BLS plausibility malfunction exists. When the vehicle control system 44 subsequently requests the current faults from the failure handling module 42, the vehicle control system 44 is informed that the BLS plausibility malfunction no longer exists. Based on this information, the vehicle control system 44 deactivates a warning light or tell-tale and/or modifies its operation back to a first operating state (e.g., an ON and fully functional state). After resetting the BLS plausibility signal check flag, the signal checking module 46 exits the signal check 80.

If tests 82 and 42 are not passed, the signal checking module 46 exits the signal check 80. By not resetting the BLS plausibility signal check flag before exiting the signal check 80, the signal checking module 46 retains the fault and/or drive cycle information stored in memory in the same state as before the signal checking module 46 executed the signal check 80. Alternatively, the signal checking module 46 may set the BLS plausibility signal check flag before exiting the second pressure sensor signal check 80 by generating a set signal. The failure handling module 42 receives the set signal and ensures that the fault information or drive cycle information stored in memory continues to indicate that the BLS versus pressure sensor plausibility malfunction exists.

Figure 7:
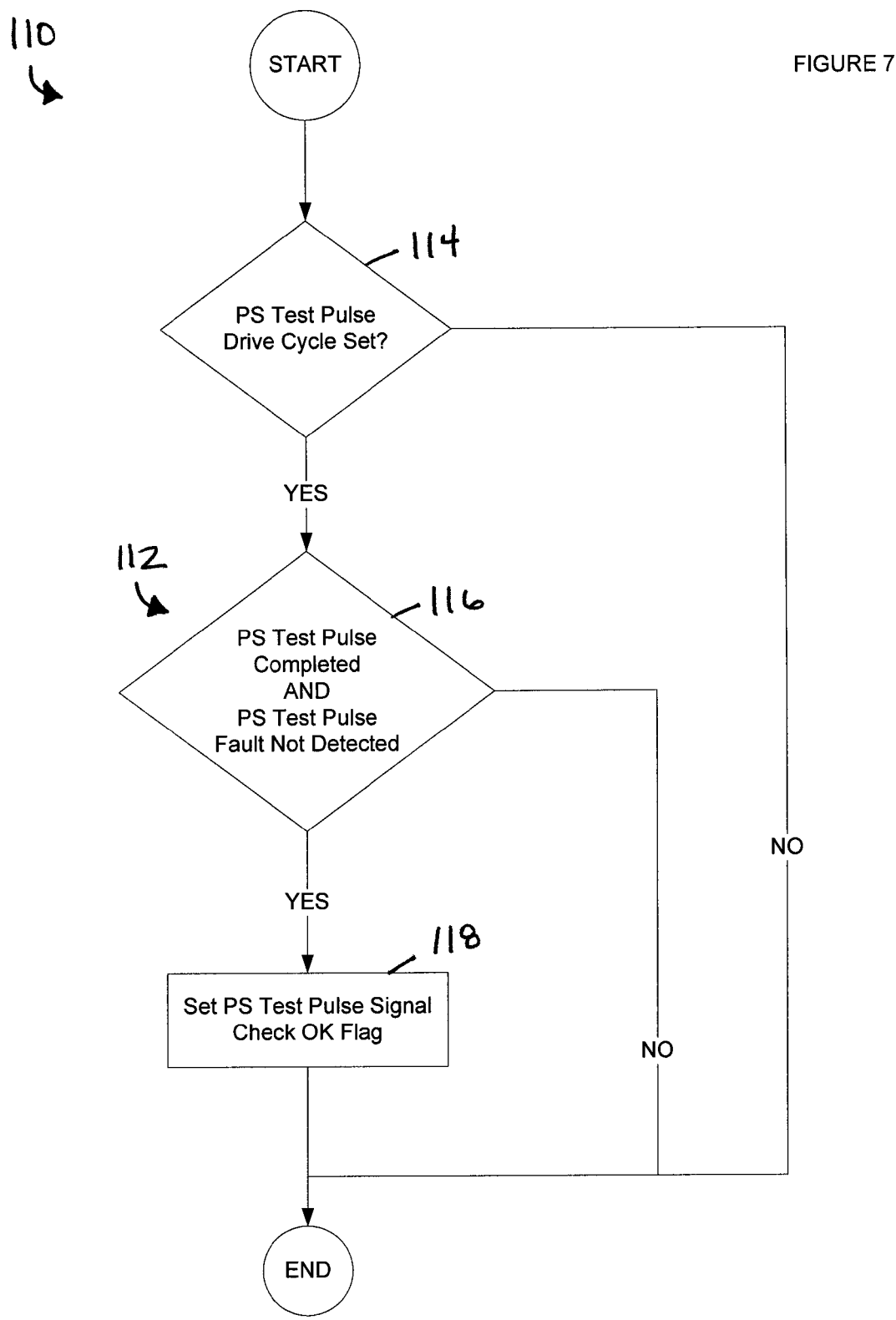
FIG. 7 illustrates a third pressure sensor signal check performed by the signal checking module of FIG. 3 according to one embodiment of the invention.

FIG. 7 shows a third pressure sensor signal check 110 performed by the signal checking module 46. The signal check 110 includes a second pressure sensor test 112 (e.g., a pressure sensor test pulse test) and is executed after the malfunction monitoring module 40 detects a pressure sensor sensitivity malfunction. In some embodiments, when the malfunction monitoring module 40 detects a pressure sensor malfunction, an ABS warning light and an ESC failure tell-tale are illuminated.

As shown in FIG. 7, the signal checking module 46 initially obtains the stored fault and/or drive cycle information and determines whether the retrieved drive cycle information includes drive cycle information for a pressure sensor sensitivity or test pulse failure (step 114). If so, the signal checking module 46 executes the second pressure sensor test 112 at step 116. Otherwise, the signal checking module 46 exits the third pressure sensor signal check 110.

Figure 8A:
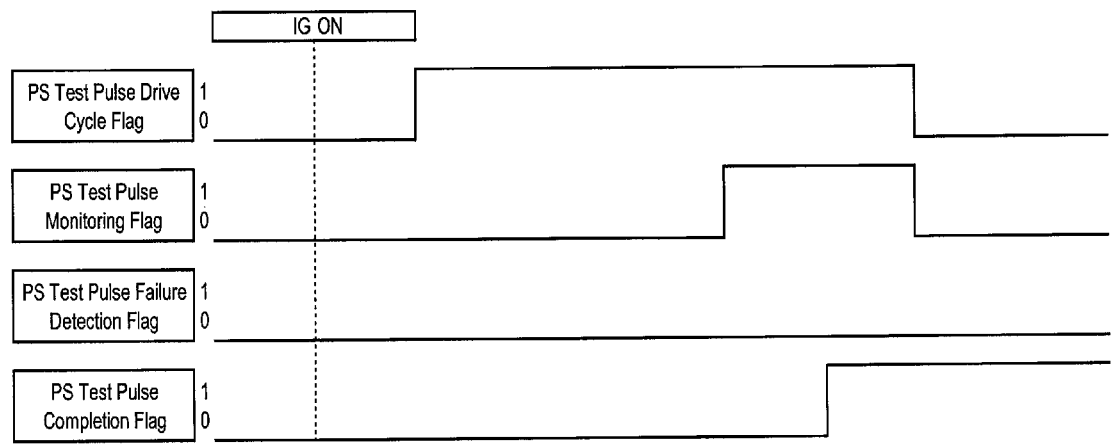
FIG. 8a illustrates the values of a cycle flag, a monitoring flag, a detection flag, and a completion flag during the third pressure sensor signal check with a successful outcome (i.e., passed good check).
Figure 8B:
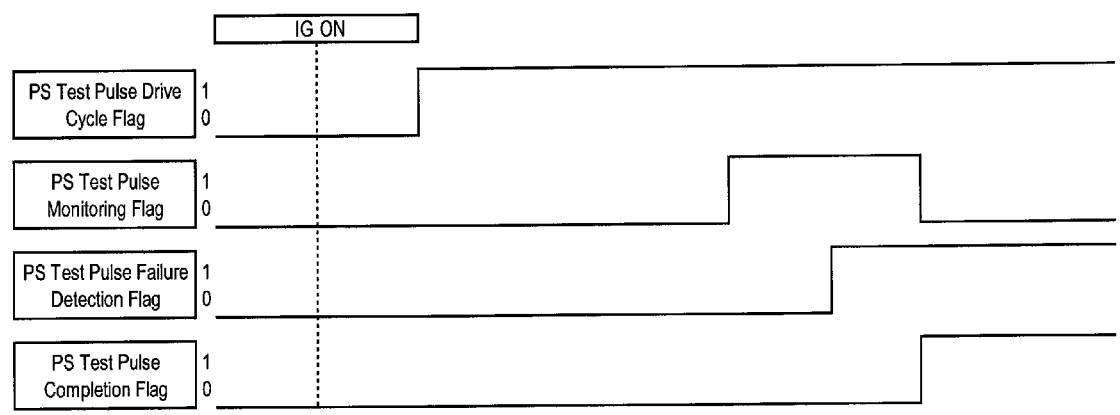
FIG. 8b illustrates the values of a cycle flag, a monitoring flag, a detection flag, and a completion flag during the third pressure sensor signal check with an unsuccessful outcome (i.e., failed good check).

As shown in FIG. 7, the second pressure sensor test 112 determines whether a test pulse sent to the pressure sensor 14*a* was completed and whether any test pulse faults were detected (step 116). The pressure sensor 14*a* is associated with multiple flags or bits, such as a drive cycle flag, a monitoring flag, a failure detection flag, and a completion flag, which are affected by a test pulse. The signal checking module 46 evaluates these flags after the test pulse to perform the test 112. FIG. 8*a* illustrates the status of these flags after a successful pressure sensor test pulse, and FIG. 8*b* illustrates the status of these flags after an unsuccessful pressure sensor test pulse. Using the status of the flags, the signal checking module 46 determines whether the completion flag is set and whether the failure detection flag is set (step 116). If so, the pressure sensor 14*a* passes the second pressure sensor test 112 and the signal checking module 46 resets the pressure sensor test pulse signal check flag to indicate that a pressure sensor sensitivity malfunction no longer exists (step 118).

However, if the completion flag is not set or the completion flag is set but the failure detection flag is also set, the pressure sensor 14*a* fails the second pressure sensor test 112 and the signal checking module 46 exits the third pressure sensor signal check 110.

In some embodiments, the signal checking module 46 executes particular signal checks during certain driving maneuvers. For example, the signal checking module 46 may execute the signal checks 50 and 100 when the vehicle 10 is traveling in a forward direction on a substantially straight path. The module 46 may execute the signal check 80 when the vehicle 10 is substantially stationary or when it is traveling in a forward direction on a substantially straight path. The signal checking module 46 may also execute other tests during a particular signal check or may only perform individual tests included in a particular signal check. For example, the signal checking module 46 may execute the first BLS test 82 as part of a signal check without also performing the first pressure sensor test 42, such as when the BLS 18 malfunctions but the pressure sensor 14*a* does not.

Thus, the invention provides, among other things, a controller for determining whether a previously-detected, vehicle sensor malfunction still exists by executing various signal checks using sensor-related information. Various features and advantages of the invention are set forth in the following claims.

What is claimed is:

1. A controller for determining whether a previously-detected, vehicle pressure-sensor malfunction still exists, the controller comprising:
   an electronic, non-volatile memory; and
   an electronic processing unit connected to the electronic, non-volatile memory, the electronic processing module including,
      a malfunction monitoring module configured to monitor the operation of a pressure sensor and generate a first fault signal if the pressure sensor outputs a signal that is outside of a first pre-determined range, the
   first fault signal containing first fault information and configured to cause at least one of a first tell-tale indicator to be activated and a first vehicle control system to modify its operation from a first operating state to a second operating state,
      a failure handling module configured to cause first drive cycle information and the first fault information to be stored in the electronic, non-volatile memory, and
      a signal checking module configured to retrieve the first drive cycle information and the first fault information from the electronic, non-volatile memory and perform a first signal check on information from the pressure sensor by comparing an output of the pressure sensor to a second pre-determined range narrower than the first pre-determined range, the pressure sensor passing the first signal check if the output of the pressure sensor is within the second pre-determined range.

2. The controller of claim 1, wherein the signal checking module performs the first signal check on information from the pressure sensor by verifying that at least one pressure sensor offset compensation function is active for a predetermined active time and verifying that an offset value for the pressure sensor is less than a predetermined threshold.

3. The controller of claim 2, wherein the signal checking module verifies that the at least one pressure sensor offset compensation function is active for the predetermined active time by verifying that a pressure sensor positive offset compensation function and a pressure sensor negative offset compensation function are active for the predetermined active time.

4. The controller of claim 2, wherein the signal checking module performs the first signal check on the information from the pressure sensor by verifying that an absolute value of a difference between an actual value of the pressure sensor and the offset value for the pressure sensor is less than a predetermined failure amount.

5. The controller of claim 2, wherein the signal checking module performs the first signal check on information from the pressure sensor while a vehicle monitored by the pressure sensor is traveling substantially forward on a substantially straight path.

6. The controller of claim 2, wherein the signal checking module generates a reset signal if the pressure sensor passes the first signal check, the reset signal configured to cause at least one of the first tell-tale indicator to be deactivated and the first vehicle control system to resume operation in the first operating state.

7. The controller of claim 1, wherein the malfunction monitoring module is configured to monitor the operation of a brake light switch and generate a second fault signal if the brake light switch malfunctions, the second fault signal containing second fault information and configured to cause at least one of a second tell-tale indicator to be activated and a second vehicle control system to modify its operation from a first operating state to a second operating state, the failure handling module storing the second drive cycle information and the second fault information in the electronic, non-volatile memory.

8. The controller of claim 7, wherein the signal checking module
retrieves the second drive cycle information and the second fault information from the electronic, non-volatile memory,
performs a second signal check on information from the brake light switch, and
if the pressure sensor passes the first signal check and the brake light switch passes the second signal check, generating a reset signal, the reset signal configured to cause at least one of the second tell-tale indicator to be deactivated and the second vehicle control system to resume operation in the first operating state.

9. The controller of claim 8, wherein the signal checking module performs the second signal check on the information from the brake light switch by verifying that the brake light switch exhibits a predetermined pattern.

10. The controller of claim 9, wherein the predetermined pattern includes a low signal for a predetermined time, then a high signal for a predetermined time, and then a second low signal for a predetermined time.

11. The controller of claim 1, wherein the signal checking module performs the first signal check on the information from the pressure sensor by verifying that a pressure sensor test pulse completes successfully without generating a pressure sensor test pulse fault.

12. The controller of claim 11, wherein the signal checking module performs the first signal check on the information from the pressure sensor while a vehicle monitored by the pressure sensor is traveling substantially forward on a substantially straight path or the vehicle monitored by the pressure sensor is substantially stationary.

13. A method, executed by a controller including an electronic processing unit and an electronic, non-volatile memory, for determining whether a previously-detected, vehicle-sensor malfunction still exists, the method comprising the steps of:
monitoring the operation of at least one of a pressure sensor and a brake light switch with a malfunction monitoring module executed by the electronic processing unit;
generating a fault signal containing fault information with the malfunction monitoring module when at least one of the pressure sensor and the brake light switch malfunctions, the malfunction being determined based on a first set of parameters;
causing at least one of a tell-tale indicator to be activated or a vehicle control system to modify its operation from a first operating state to a second operating state in response to the fault signal;
storing drive cycle information and the fault information in the electronic, non-volatile memory with a failure handling module executed by the electronic processing unit;
retrieving the drive cycle information and the fault information from the electronic, non-volatile memory;
performing a signal check on information from at least one of the pressure sensor and the brake light switch with a signal checking module executed by the electronic processing unit, the signal check using a second set of parameters more stringent than the first set of parameters; and
generating, in response to at least one of the pressure sensor and the brake light switch passing the signal check, a reset signal with the signal checking module that causes at least one of the tell-tale indictor to be deactivated and the vehicle control system to resume operation in the first operating state.

14. The method of claim 13, wherein performing the signal check includes verifying that at least one pressure sensor offset compensation function is active for a predetermined active time and verifying that an offset value for the pressure sensor is less than a predetermined threshold.

15. The method of claim 14, wherein verifying that at least one pressure sensor offset compensation function is active for the predetermined active time includes verifying that a pressure sensor positive offset compensation function and a pressure sensor negative offset compensation function are active for the predetermined active time.

16. The method of claim 14, wherein performing the signal check includes verifying that an absolute value of a difference between an actual value of the pressure sensor and the offset value for the pressure sensor is less than a predetermined failure amount.

17. The method of claim 13, wherein performing the signal check includes verifying that a pressure sensor test pulse completes successfully without generating a pressure sensor test pulse fault.

18. The method of claim 13, wherein performing the signal check includes verifying that the brake light switch exhibits a predetermined pattern.

19. The method of claim 18, wherein verifying that the brake light switch exhibits a predetermined pattern includes verifying that the brake light switch generates a low signal for a predetermined time, then a high signal for a predetermined time, and then a second low signal for a predetermined time.

20. The method of claim 13, wherein performing the signal check includes performing the signal check while a vehicle monitored by the pressure sensor and the brake light switch is traveling substantially forward on a substantially straight path or is substantially stationary.

* * * * *